United States Patent
Biver et al.

(10) Patent No.: US 10,585,199 B2
(45) Date of Patent: Mar. 10, 2020

(54) METHOD FOR DETERMINING A LITHOLOGY MAP

(71) Applicant: TOTAL SA, Courbevoie (FR)

(72) Inventors: Pierre Biver, Pau (FR); Frederik Pivot, Pau (FR); Vincent Henrion, Pau (FR)

(73) Assignee: TOTAL SA, Courbevoie (FR)

( * ) Notice: Subject to any disclaimer, the term of this patent is extended or adjusted under 35 U.S.C. 154(b) by 720 days.

(21) Appl. No.: 14/394,981

(22) PCT Filed: Apr. 12, 2013

(86) PCT No.: PCT/EP2013/057724
§ 371 (c)(1),
(2) Date: Oct. 16, 2014

(87) PCT Pub. No.: WO2013/156412
PCT Pub. Date: Oct. 24, 2013

(65) Prior Publication Data
US 2015/0071037 A1   Mar. 12, 2015

(30) Foreign Application Priority Data

Apr. 16, 2012 (EP) .................................... 12305446

(51) Int. Cl.
*G01V 1/30* (2006.01)
*G01V 1/50* (2006.01)

(52) U.S. Cl.
CPC ................ *G01V 1/306* (2013.01); *G01V 1/50* (2013.01); *G01V 2210/665* (2013.01)

(58) Field of Classification Search
CPC .. G01V 11/00; G01V 2210/665; G01V 1/306; G01V 1/50
See application file for complete search history.

(56) References Cited

U.S. PATENT DOCUMENTS

2011/0172977 A1*  7/2011  Kolbjornsen .......... G01V 11/00 703/2
2011/0231170 A1*  9/2011  Biver ..................... G01V 11/00 703/2

FOREIGN PATENT DOCUMENTS

FR           293895 A1    5/2010
WO    WO 01/33481 A1    5/2001

OTHER PUBLICATIONS

PCT International Search Report and Written Opinion for PCT/EP2013/057724, dated Oct. 30, 2013, 10 pgs.

(Continued)

*Primary Examiner* — Kyle R Quigley
(74) *Attorney, Agent, or Firm* — Patterson Thuente Pedersen, P.A.

(57) ABSTRACT

The present invention relates to a method for determining a lithology map. The method comprises receiving a geophysical attribute image comprising a plurality of points associated with geophysical attribute value, and receiving first information data representing a plurality of zones in the image, each point of the image being contained in a zone. For at least one point of the image, computing a uniform value associated with said point based on the geophysical attribute value and distributions values of the geophysical attribute values. The method further comprises receiving second information data representing geological probability value for a plurality of facies associated with the points of the image, and for at least one point of the image, determining a facies in the plurality facies based on the computed uniform value and the geological probabilities associated with said point.

12 Claims, 7 Drawing Sheets

(56) References Cited

OTHER PUBLICATIONS

PCT International Preliminary Report on Patentability for PCT/EP2013/057724, dated Oct. 21, 2014, 6 pgs.

Pieerre Biver et al., "Estimation of most likely lithology map in the context of Truncated Gaussian techniques", Ninth International Geostatistics Congress, Oslo, Norway Jun. 11-15, 2012, 8 pgs.

X. Emery et al., "Geostatistical modelling of rock type domains with spatially varying proportions: application to a porphyry copper deposit", Journal of the Southern African Institute of Mining and Metallurgy, Southern Afrivan Institute of Mining and Metallurgy—SAIMM, Johannesburg, South Africa, vol. 108, No. 5, May 1, 2008, 8 pgs.

* cited by examiner

METHOD FOR DETERMINING A LITHOLOGY MAP

RELATED APPLICATIONS

The present application is a National Stage entry of PCT Application No. PCT/EP2013/057724, filed Apr. 12, 2013, which claims priority from EP Patent Application No. 12305446.2, filed Apr. 16, 2012, said applications being hereby incorporated by reference herein in their entirety.

FIELD OF THE INVENTION

The present invention relates to the determination of a lithology map, in particular in the context of truncated Gaussian techniques.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

The determination of a lithology map is important for modeling petroleum, oil and/or gas reservoirs. Thus, this determination is a key point for geologists.

After a discovery of a reservoir, petroleum engineers and/or geologists seek to build a clear picture of the accumulation. Most of the time, the first stage is to conduct a seismic survey to determine the possible size of the trap and to estimate the volume of oil bearing reservoir. Geologists, geophysicists and reservoir engineers work together to build a model which enables simulations (for instance, simulation of the flow of fluids in the reservoir) leading to improved estimates of oil/gas reserves. Thus, it is very important to have accurate lithology map for this estimation.

To constrain a lithology model to seismic, a classical approach may be to derive soft probabilities from rock physics and statistical analysis of geophysical properties (inverted acoustic impedances or pseudo V-Clay). Usually a relevant analysis can be performed at log scale; but it is not obvious to transfer this information at the scale of a grid cell for geo-modeling prediction. Up-scaling issues lead usually to less contrasted soft probabilities and the direct use of these probabilities in geostatistical processes are often deceiving.

Some transformations may be suggested to use these seismic soft probabilities but these transformations are usually subjective and case dependant.

Other suggestions may be to combine soft probabilities with probabilities interpreted form well data and geological analysis but debates may be raised:
  Which combination is to be used? Is it a convex or concave combination?
  Which is the most representative probability? Is it geological probabilities because they are based on hard data or geophysical probabilities because they are more representative of the entire reservoir?

For all these reasons, there is a need to conciliate geological and geophysical point of views in order to provide an additional tool focused on estimation of lithology instead of classical simulation process.

SUMMARY OF THE INVENTION

The invention relates to a method for determining a lithology map. The method comprises:
  receiving a geophysical attribute image, the image comprising a plurality of points associated with n geophysical attribute comprising values, n being an integer greater than 0, wherein for each point in the plurality of points, the geophysical attribute are ordered;
  receiving first information data representing a plurality of zones in the image, each point of the image being contained in a zone;
  for each j in [1; n]:
    for at least one current point of the image, computing a uniform value associated with the current point based on:
      the $j^{th}$ geophysical attribute value, and
      distributions values of the $j^{th}$ geophysical attribute value associated with points of the zone containing the current point;
  receiving second information data representing geological probability values for a plurality of facies associated with the points of the image;
  for at least one current point of the image where a uniform value is computed, determining a facies in the plurality facies based on:
    the n computed uniform values computed for each geophysical attributes and associated with the current point, and
    the geological probability values associated with said current point.

A lithology map may be a set of data associating points with facies. Therefore, it is possible to determine for each point of subsoil an estimated facies.

Then, each point may be associated with n geophysical attributes values (i.e. a first one, a second one, a third one, etc.). n may be equal to 1. These n geophysical attribute values may be seen as components of a vector associated with the point.

The $j^{th}$ components are the same geophysical attribute for all points.

An image is not necessarily a visual image. The terminology "image" covers all sets of data representing a geological subsoil/zone.

Moreover, the $k^{th}$ geophysical attribute value may comprise at least one value in a group comprising a seismic value, an acoustic impedance value and a pseudo V-Clay value, k being an integer in [1; n].

This geophysical attribute may also be, more generally any variable issued from an acquisition process measuring a property continuously in space.

The zones may represent at least one zone in a group comprising environment of deposition zones or EOD, an architectural elements zone or AE, and large geological bodies.

The computation of uniform values may be performed for all points of the images.

Therefore, it is possible to replace all geophysical attribute values with new uniform values.

The computation of uniform values may also be performed for all points of the images where the geophysical attributes are defined.

In a specific embodiment, the distribution value of a value of the $m^{th}$ geophysical attribute in a zone, m being an integer in [1; n], may be computed based on:
  a first number of points in said zone associated with said value of the $m^{th}$ geophysical attribute;
  a second number of points in said zone.

The distribution value may be equal to the division of the first number by the second number.

According to an embodiment, the distribution value of a first value of the $p^{th}$ geophysical attribute in a zone, p being an integer in [1; n], may be computed based on:
- a third number of points in said zone associated with a value of the $p^{th}$ geophysical attribute, the distance between the latter value and the first value being lower than a predetermined threshold value;
- a fourth number of points in said zone.

The distribution value may be equal to the division of the third number by the fourth number.

According to an embodiment, computing a uniform value associated with a point may comprise:
- determining a first sum, the first sum being a sum of distribution values of a geophysical attribute values equal or below the geophysical attribute value associated with said point in a zone containing said point;
- determining a second sum, the second sum being a sum of distribution values of a geophysical attribute values in a zone containing said point.

The first sum may be noted $$\sum_{y=min(Y)}^{Y} f_i(y).$$

Then y may range from min(Y) to Y (with Y a notation for Y(x), i.e. the value of the geophysical attribute at point x), $f_i(Y)$ being a notation for the distribution of geophysical attribute values in in a zone i containing said point The second sum may be noted $$\sum_{y=min(Y)}^{max(Y)} f_i(y).$$

Then y may range from min(Y) to max(Y). min(Y) and max(Y) are notations for the minimal value and the maximal value of Y(x) for all coordinates x in the image.

In a possible embodiment, the uniform value is function of the division of the first sum by the second sum i.e.

$$F_i(Y) = \frac{\sum_{y=min(Y)}^{Y} f_i(y)}{\sum_{y=min(Y)}^{max(Y)} f_i(y)}.$$

In addition, the method may further comprise:
- receiving well data representing geological information for a plurality of facies associated with well points of the image;
- for each facies, determining modified geological probability values associated with points of the image based on the well data for said facies and received geological probability values for said facies;
- For at least one point of the image, determining a facies may be based on the computed uniform value for each j in [1; n], and the modified geological probabilities associated with said point.

According a possible embodiment, determining modified geological probability values for a facies comprises performing an exact interpolation process based on the well data for said facies and received geological probability values for said facies.

Exact interpolators may honor the data points upon which the interpolation is based. For instance, a Kriging process may be used for the exact Interpolation.

Kriging is a group of geostatistical techniques to interpolate the value of a random variable at an unobserved location from observations of its value at nearby locations.

Well data may provide, for each facies, the proportion of said facies at a point. This proportion information is commonly named facies indicator.

Determining a facies may use a truncation diagram.

In a possible embodiment, n may be equal to 1 or 2.

Another aspect of the invention relates to a device for determining a lithology map. The device comprises:
- an interface for receiving a geophysical attribute image, the image comprising a plurality of points associated with n geophysical attribute comprising values, n being an integer greater than 0, wherein for each point in the plurality of points, the geophysical attribute are ordered;
- an interface for receiving first information data representing a plurality of zones in the image, each point of the image being contained in a zone;
- for each j in [1; n]:
  - for at least one current point of the image, a circuit for computing a uniform value, associated with the current point based on:
    - the $j^{th}$ geophysical attribute value, and
    - distributions values of the $j^{th}$ geophysical attribute value associated with points of the zone containing the current point;
- an interface for receiving second information data representing geological probability values for a plurality of facies associated with the points of the image;
- for at least one current point of the image where a uniform value is computed, a circuit for determining a facies in the plurality facies based on:
  - the n computed uniform values computed for each geophysical attributes and associated with the current point, and
  - the geological probability values associated with said current point.

A third aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF THE DRAWINGS

Figure 1:
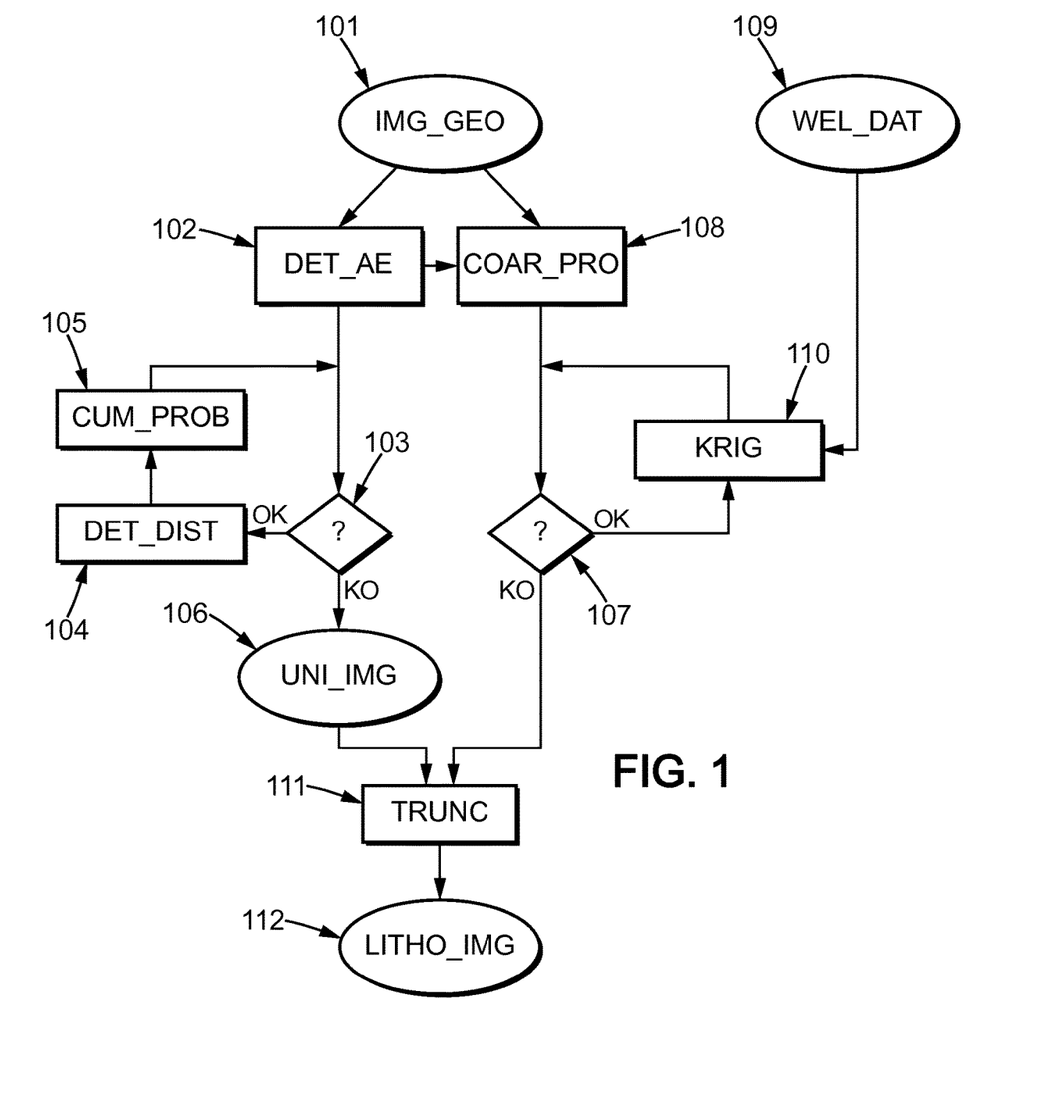
FIG. 1 is a flow chart describing a possible embodiment of the present invention.

FIG. 1 is a flow chart describing a possible embodiment of the present invention.

Part of this flow chart can represent steps of an example of a computer program which may be executed by a circuit/processor.

Upon reception of geophysical attribute image 101, it may be possible to determine (step 102) the architectural elements present in the subsoil.

Architectural elements have been first defined by Pickering et al. in 1998 as an interpretive characterization of a sedimentary feature distinguished on the basis of its geometry, scale and facies. Different techniques may be use to defined architectural elements such as stochastic methods, or other computer based techniques. Geologists may also use their own knowledge and experience to determine or enhance the contours of architectural elements when receiving a geophysical attribute image.

The geophysical attribute image may be for instance a seismic/acoustic impedance image for instance or a pseudo V-Clay image.

Figure 2A:
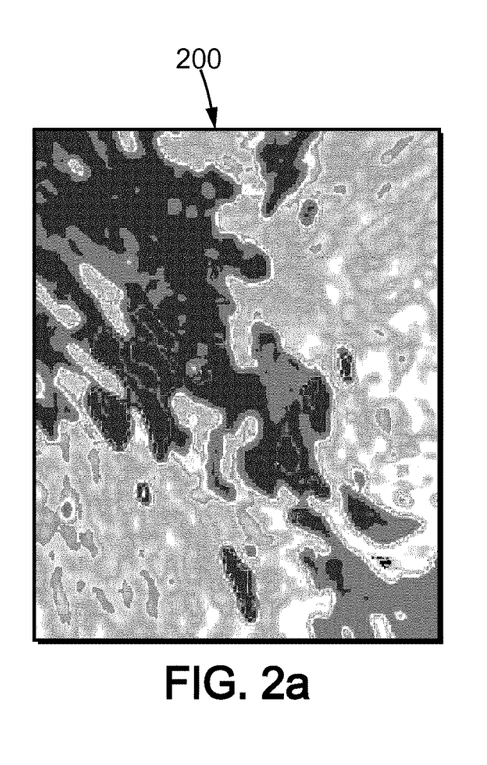
FIG. 2a is a representation of seismic image representing the ratio of the measured acoustic impedances.

In reference to FIG. 2a, image 200 may be for instance a typical representation of a seismic image representing the ratio of the measured acoustic impedances.

Figure 2B:
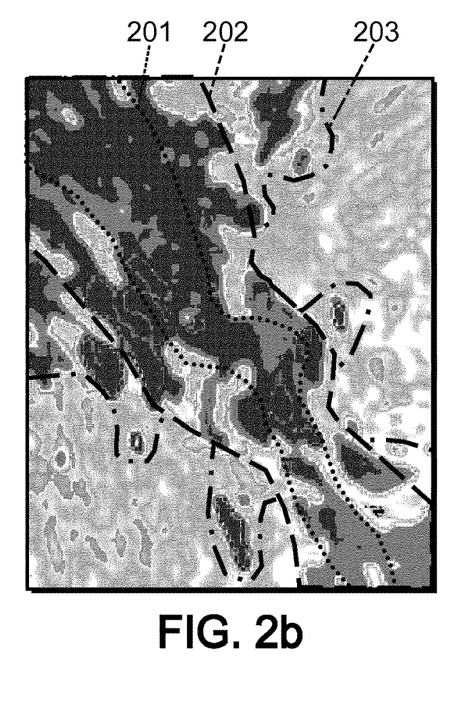
FIG. 2b represents the determination of architectural elements according to an seismic image.

According to this image, it is possible to determine/estimate the contours (dotted line 201, dashed line 202 and alternated doted and dashed line 203 in FIG. 2b) of architectural elements.

Figure 2C:
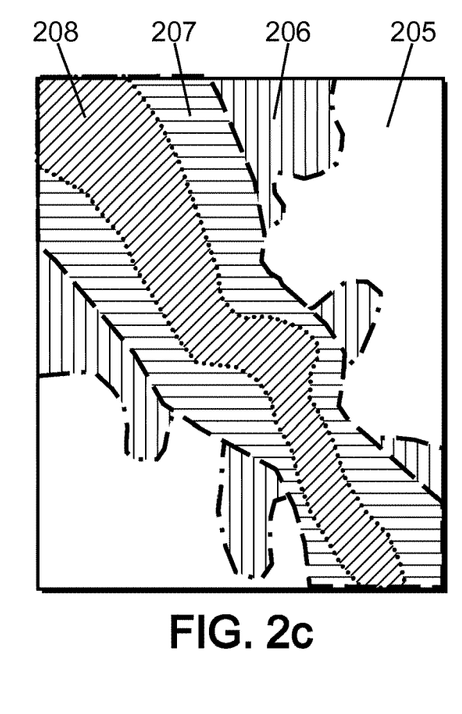
FIG. 2c is a representation of architectural elements according to an seismic image.

Therefore, four different architectural zones may be defined in FIG. 2c representing architectural elements:
 zone 208 would be the channel axis,
 zone 207 would be the channel margin,
 zone 206 would be the splays,
 zone 205 would be the background.

After the architectural elements having been determined, a uniform transform may be performed on each determined architectural element.

Figure 3:
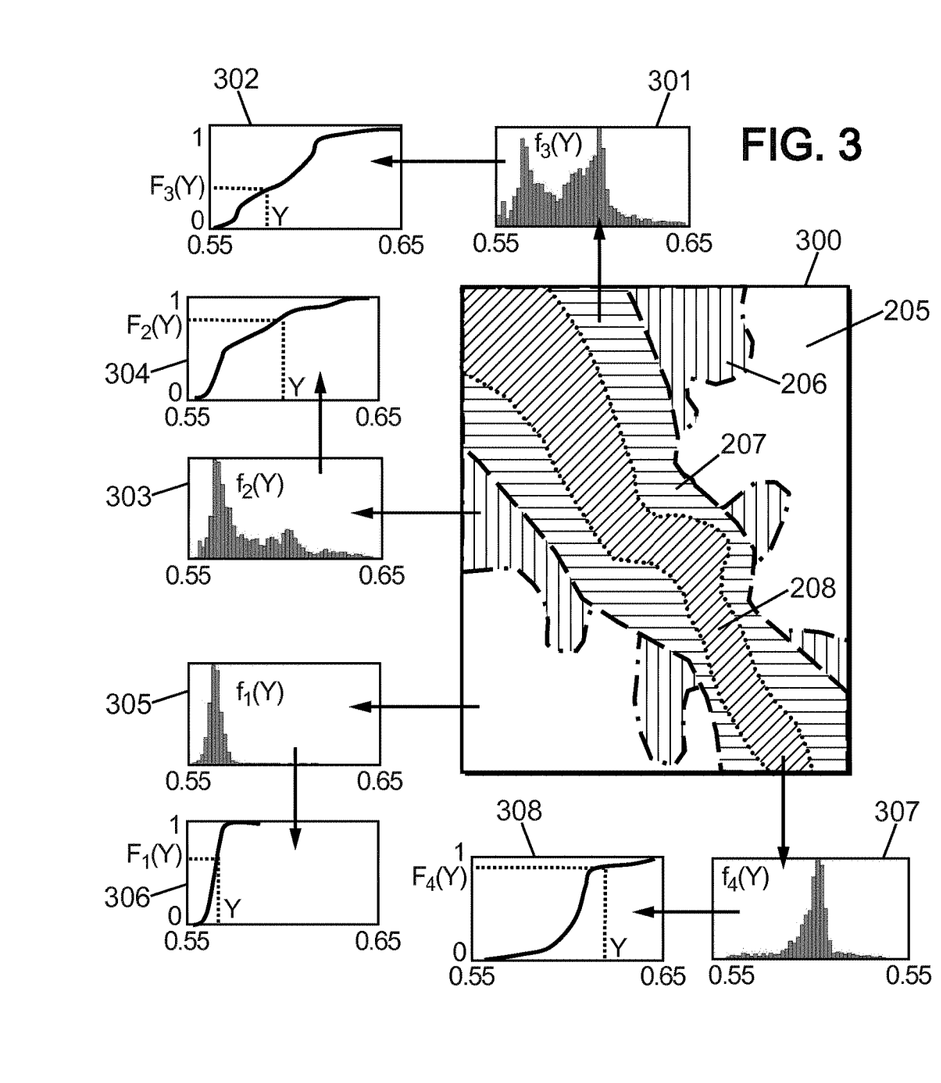
FIG. 3 represents the standardization process on a seismic image.

Therefore, if one architectural element has not been processed (test 103, output OK), the following processing is performed:
 in the considered architectural element, the distribution of the geophysical attribute (e.g. measured acoustic impedance in FIG. 2a) is determined (step 104 of FIG. 1).This determination may, for instance, be function of the number of pixels in the architectural element of the geophysical attribute image with a determined value (or within a determined interval). This determination may also be function of the surface in the architectural element with a determined value (or within a determined interval). For instance, in FIG. 3, it is determined that:
 in architectural element 205, the distribution $f_1$ is represented by the graphic 305, the distribution being maximal for acoustic impedance value next to 0.56;
 in architectural element 206, the distribution $f_2$ is represented by the graphic 303, the distribution being maximal for acoustic impedance value next to 0.56;
 in architectural element 207, the distribution $f_3$ is represented by the graphic 301, the distribution being maximal for acoustic impedance value next to 0.60 with a second maximum next to 0.56;
 in architectural element 208, the distribution $f_4$ is represented by the graphic 307, the distribution being maximal for acoustic impedance value next to 0.60.

once the distribution of the geophysical have been determined, a cumulated probability $F_i (i=1 \ldots 4)$ may be determined (step 105) for each distribution $f_i$ ($i=1 \ldots 4$). For instance, it is possible to add the distribution value $f_i(Y)$ for a given geophysical attribute value Y (Y being a notation for Y(x) with x coordinates in the image) with all other distribution values for the values below the given geophysical attribute value, then divide all cumulated values with the maximum value in the cumulated values.

i.e.

$$F_i(Y) = \frac{\sum_{y=min(Y)}^{Y} f_i(y)}{\sum_{y=min(Y)}^{max(Y)} f_i(y)}$$

for discrete values of Y(x). min(Y) and max(Y) are notations for the minimal value and the maximal value of Y(x) for all coordinates x in the image.

This formula may be generalized for continuous values of Y with an integral function. For instance, in FIG. 3:
 in architectural element 205, the cumulated probability $F_1$ is represented by the graphic 306;
 in architectural element 206, the cumulated probability $F_2$ is represented by the graphic 304;
 in architectural element 207, the cumulated probability $F_3$ is represented by the graphic 302;
 in architectural element 208, the cumulated probability $F_4$ is represented by the graphic 308.

A new representation of the geophysical attributes in the architectural element i ($i=1 \ldots 4$) may be computed based on the cumulated probability $F_i$ by replacing in the image the geophysical value Y by cumulated probability $F_i(Y)$. Then, for each point with coordinates x in the geophysical attribute image, the value Y(x) is replaced with $F(Y(x))=F_1(Y(x))+F_2(Y(x))+F_3(Y(x))+F_4(Y(x))$. This formula is consistent with the above statement as only one cumulated probability is different from 0 for a given x.

If all architectural element has not been processed (test 103, output KO), it is possible to recombine the new representations of the architectural element and to compute a new standardized image (111).

Figure 4:
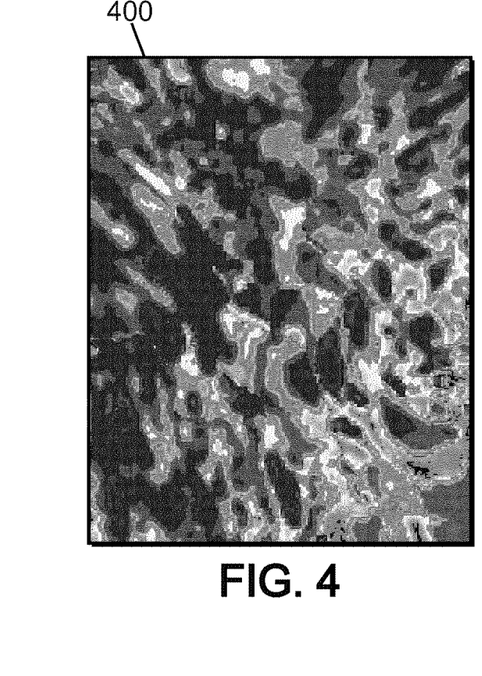
FIG. 4 represents a standardized probability image.

The new standardized image may be similar to the one (400) represented in FIG. 4.

FIGS. 5a to 5d represent initial geological probabilities of four different facies in the different architectural elements.

In the representation of FIGS. 5a to 5d, the darker a point of the image is, the most probable the considered facies is present at that point.

Initial probabilities $P_k$ (k=1 ... 4, one for each facies) may be determined (step 108) based on the received image 101 and/or on the architectural elements determined in step 102.

The initial probabilities $P_k$ may be determined based on the determination of the architectural elements and the knowledge of geologists/reservoir engineers. For instance, a channel axis most likely contains a clay facies.

The initial probabilities $P_k$ may also be determined based on facies measurements in wells drilled all over architectural element zones.

The initial probabilities $P_k$ may also be received from external sources such as a previous geological survey in that zone.

Figure 5A:
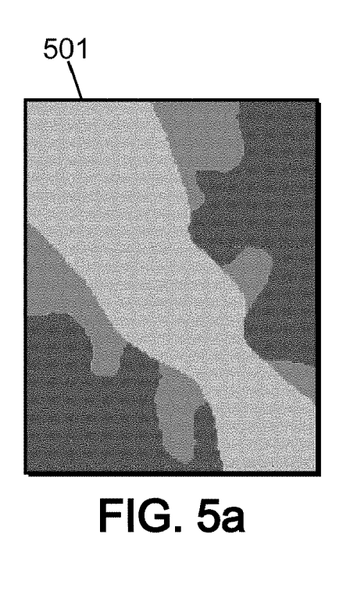
FIGS. 5a to 5d represent geological proportion of four different facies in the different architectural elements.

The initial probability of a first facies would be noted $P_1(x)$ (with x the coordinates in the geophysical attribute image) and is represented by image 501 of FIG. 5a.

Figure 5B:
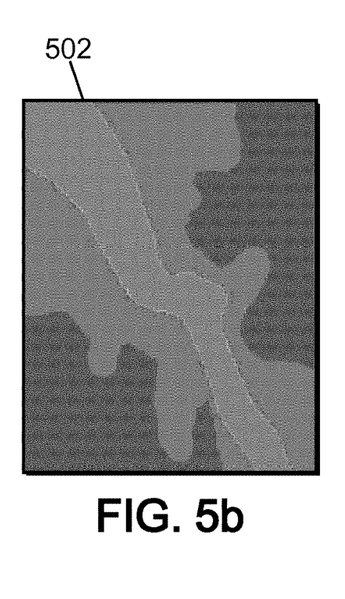

The initial probability of a second facies would be noted $P_2(x)$ and is represented by image 502 of FIG. 5b.

Figure 5C:
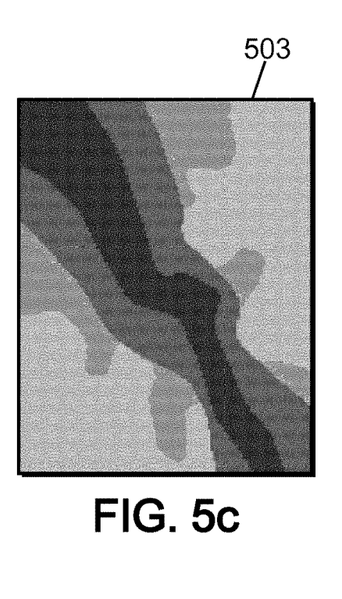

The initial probability of a third facies would be noted $P_3(x)$ and is represented by image 503 of FIG. 5c.

Figure 5D:
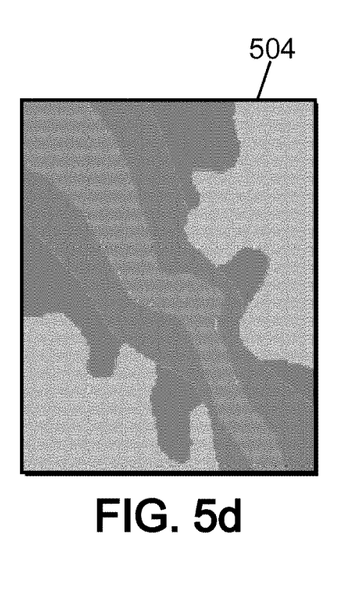
Figure 6A:
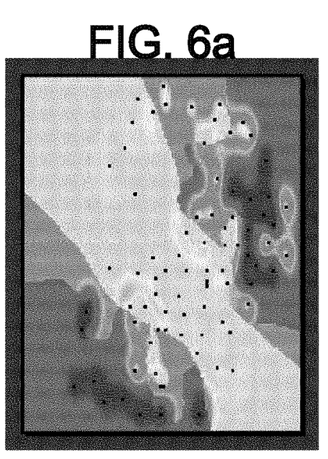
FIGS. 6a to 6d represent corrected geological proportion according to a kriging process of four different facies in the different architectural elements with wells representation.
Figure 6B:
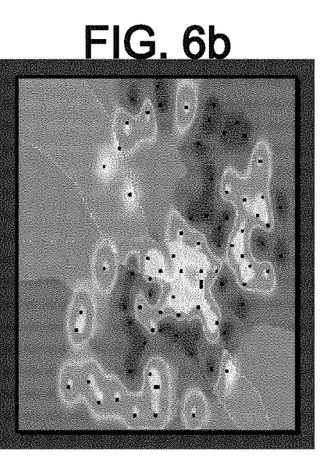
Figure 6C:
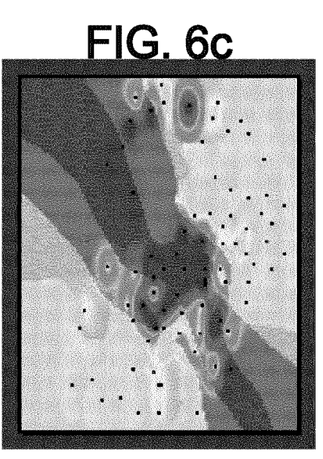
Figure 6D:
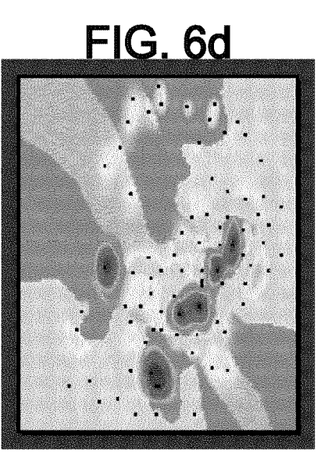
Figure 6E:
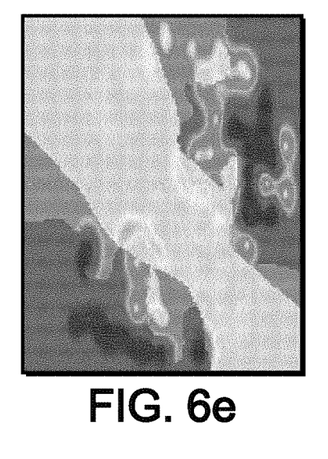
FIGS. 6e to 6h represent corrected geological proportion according to a kriging process of four different facies in the different architectural elements without wells representation.
Figure 6F:
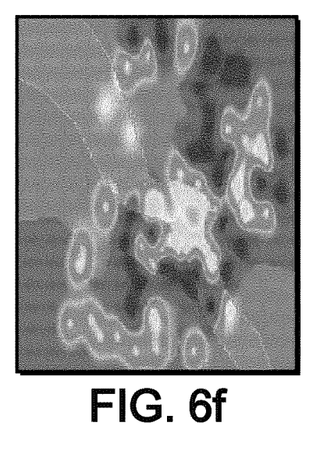
Figure 6G:
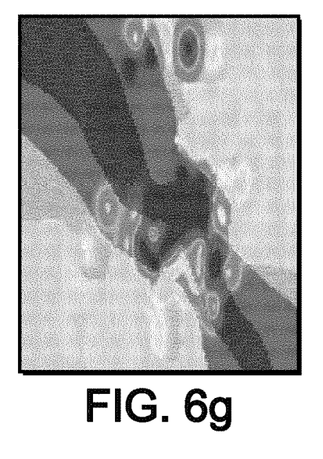
Figure 6H:
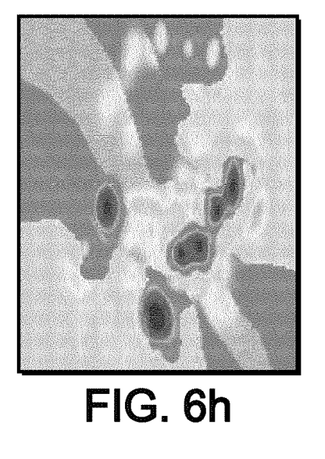

The initial probability of a fourth facies would be noted $P_4(x)$ and is represented by image 504 of FIG. 5d.

Nevertheless, the probability $P_k$ may not perfectly match the wells data $W_k(x_j)$ (element 109) determined at different point with coordinates $x_j$ (j=1 ... n) for the facies k. Then, it may be advantageous to modify the probability $P_k$ to take into account such wells data $W_k(x_j)$ (element 109). Such well data may indeed provide well indicator data representing proportions of facies at a given point.

Therefore, if one initial probability $P_k$ has not been modified (test 107, output OK), the probability $P_k(x)$ is locally modified (step 110) based on the wells data $W_k(x_j)$ (element 109).

This modification may comprise a Kriging method and/or a shifting window mean and/or any exact interpolator.

In one embodiment, the modified probability $P'_k(x)$ may be defined as $$P'_k(x) = P_k(x) + \sum_{j=1}^{n} \lambda_j (W_k(x_j) - P_k(x))$$

where $\lambda_j$ are the kriging weights provided by the kriging system: $\lfloor C_{jm} \rfloor \lambda_m = (C_{jx})$ with $C_{jm}$ the covariance matrix between wells data points and C the covariance vector between wells data points and the point x to estimate. The covariance matrix and the covariance vector are specific for each facies k and may be computed based on the wells data points $W_k(x_j)$.

FIGS. 6a to 6d represent corrected geological probabilities $P'_1(x)$, $P'_2(x)$, $P'_3(x)$, $P'_4(x)$ for four respective different facies (first facies, second facies, third facies and fourth facies) with wells representation. FIGS. 6e to 6h represent the same corrected geological probabilities, but without the wells representation.

Figure 7A:
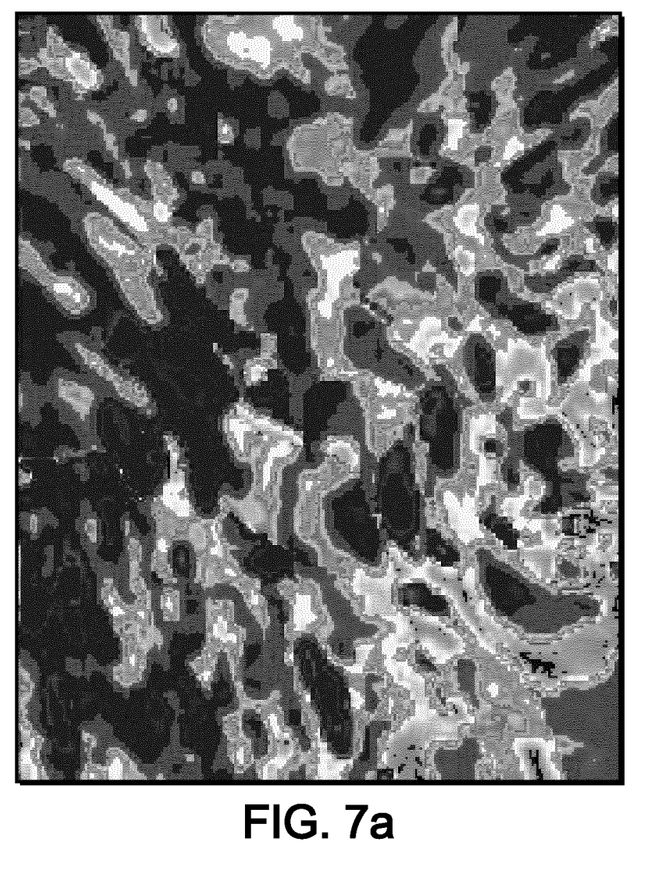
FIG. 7a represents a standardized probability image.

Once the standardized image 106 (represented in FIG. 7a) has been computed and once the corrected geological probabilities $P'_1(x)$, $P'_2(x)$, $P'_3(x)$, $P'_4(x)$ for the different facies have been determined, it is possible to determine a final facies repartition image based on a truncation process (step 111 of FIG. 1).

The truncation process may be defined according the following step. For each point with coordinates x of the standardized image 106 (represented in FIG. 7a):
  determining the value F(Y(x)) associated with said point (i.e. the cumulated probability, see above);
  if the determined value is below $P'_1(x)$, then the point is associated with the first facies;
  if the determined value is above $P'_1(x)$ but below $P'_1(x)+P'_2(x)$, then the point is associated with the second facies;
  if the determined value is above $P'_1(x)+P'_2(x)$ but below $P'_1(x)+P'_2(x)+P'_3(x)$, then the point is associated with the third facies;
  if the determined value is above $P'_1(x)+P'_2(x)+P'_3(x)$, then the point is associated with the fourth facies.

When all points of the geophysical attribute image 101 have been processed according to the truncation process (step 111), a final facies repartition image 112 may be outputted.

Figure 7B:
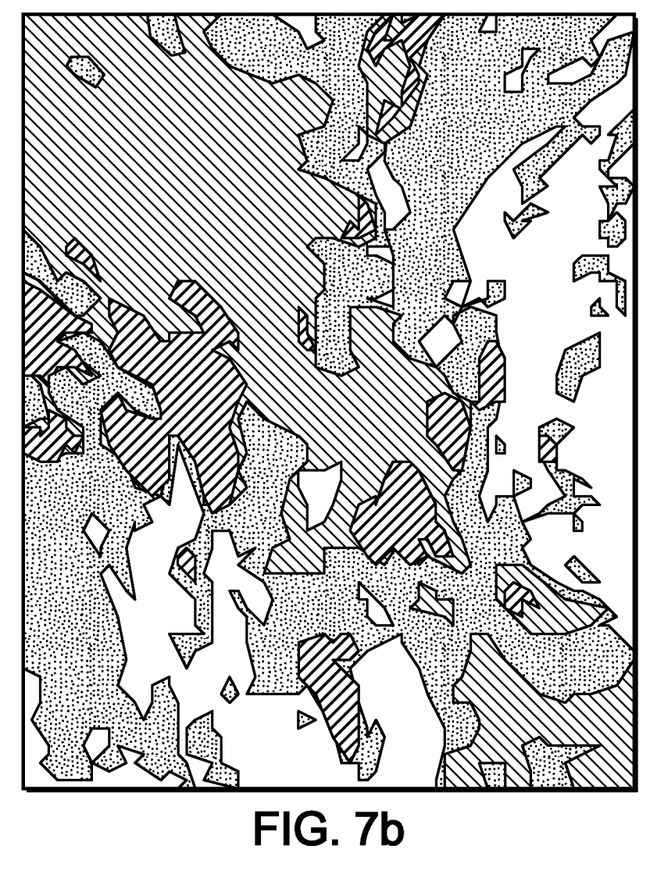
FIG. 7b represents a final facies repartition.

FIG. 7b represents a final facies repartition image according the above presented truncation process. Each different pattern represents a different facies.

It is also possible to use a truncation diagram to determine the associated facies.

Figure 9:
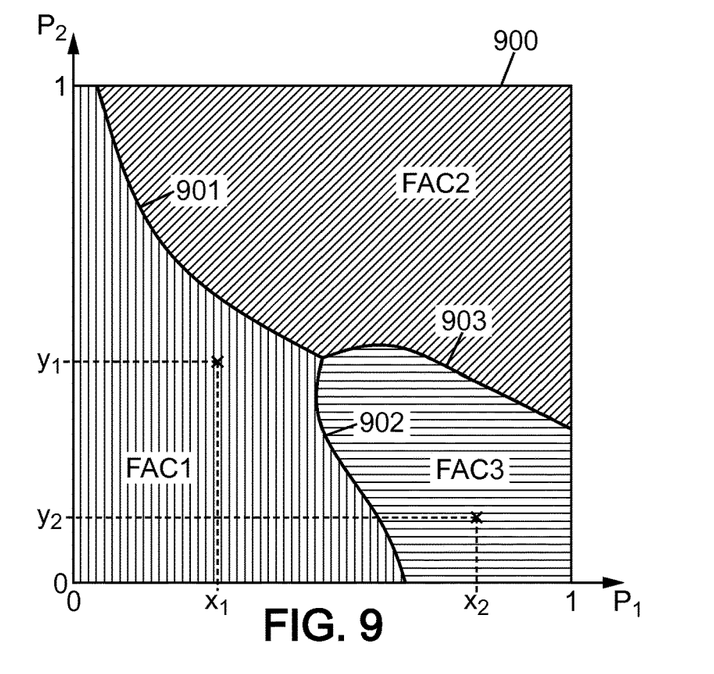
FIG. 9 is an example of truncation diagram.

In the truncation diagram of FIG. 9, line 901 represents the separation line between facies FAC1 and FAC2 in the truncation diagram 900. Line 902 represents the separation line between facies FAC1 and FAC3 in the truncation diagram 900. Line 903 represents the separation line between facies FAC2 and FAC3 in the truncation diagram 900.

When two geological attributes are used, it is possible to independently determine their cumulated probability values at a given point in the model.

For instance, if the cumulated probability value of the first geological attribute $P_1$ is $x_1$ and if the cumulated probability value of the second geological attributes $P_2$ is $y_1$, the determined facies is FAC1 according to the truncation diagram 900 of FIG. 9 (i.e. point of coordinates $(x_1, y_1)$ in the truncation diagram 900 is in the FAC1 xone).

If the cumulated probability value of the first geological attribute $P_1$ is $x_2$ and if the cumulated probability value of the second geological attributes $P_2$ is $y_2$, the determined facies is FAC3 according to the truncation diagram 900 of FIG. 9 (i.e. point of coordinates $(x_2, y_2)$ in the truncation diagram 900 is in the FAC3 zone).

This disclosure is adaptable for any number n of geological attributes, the truncation diagram being a n-dimensional diagram.

Figure 8:
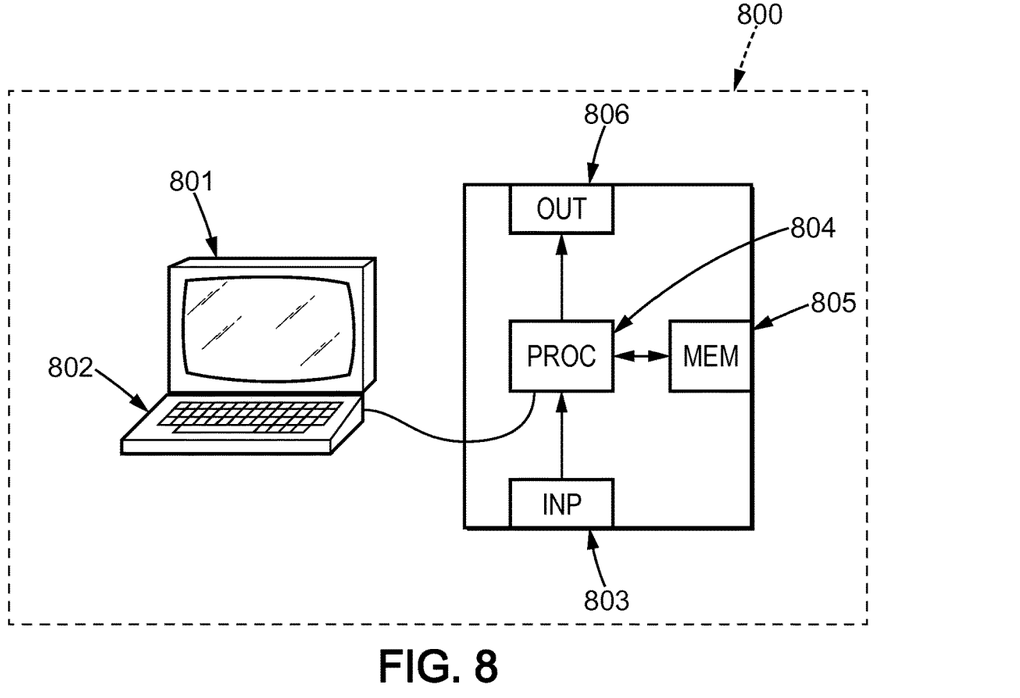
FIG. 8 is a possible embodiment for a device that enables the present invention.

FIG. 8 is a possible embodiment for a device that enables the present invention.

In this embodiment, the device 800 comprises a computer. This computer comprising a memory 805 to store program instructions loadable into a circuit and adapted to cause circuit 804 to carry out the steps of the present invention when the program instructions are run by the circuit 804.

The memory 805 may also store data and useful information for carrying the steps of the present invention as described above.

The circuit 804 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»)).

This computer comprises an input interface 803 for the reception of the geophysical attribute image according to the invention and an output interface 606 for providing final facies repartition image (or lithology map).

To ease the interaction with the computer, a screen 801 and a keyboard 802 may be provided and connected to the computer circuit 804.

A person skilled in the art will readily appreciate that various parameters disclosed in the description may be modified and that various embodiments disclosed may be combined without departing from the scope of the invention.

For instance, the above description refers to only four facies but the disclosure is applicable for any number of facies. Moreover, two different truncation processes have been presented to determine the associated facies: a one dimensional truncation process and a two dimensional truncation process (see FIG. 9). The adaptation of such disclosures to any number of dimensions is straight forward for the person skilled in the art regarding the previous examples.

The invention claimed is:

1. A method for determining a lithology map, wherein the method comprises:
    receiving a geophysical attribute image, the image comprising a plurality of points, each point in the plurality of points being associated with n geophysical attributes, each attribute of the n geophysical attributes having a respective value, n being an integer greater than 0, wherein for each point in the plurality of points, the geophysical attributes having an order index;
    receiving first information data representing a plurality of zones in the image, each point of the image being contained in a zone;
    for each integer j in [1; n]:
        for at least one current point (x) of the image, computing a uniform value ($F_j(Y(x))$) associated with the current point (x) based on:
            a $j^{th}$ geophysical attribute value (Y(x)), wherein the $j^{th}$ geophysical attribute value comprises at least one value in a group comprising a seismic value, an acoustic impedance value and a pseudo V-Clay value, and
            distributions values ($f_j(y)$) of the $j^{th}$ geophysical attribute value associated with points of the zone containing the current point;
    receiving second information data representing geological probability values for a plurality of facies, said geological probability values being associated with the points of the image;
    for at least one current point (x) of the image where a uniform value is computed, determining a determined facies in the plurality of facies based on:
        n computed uniform values computed for each geophysical attribute and associated with the current point, and
        the geological probability values associated with said current point;
    providing a final facies repartition image based on said determined facies;
    estimating an oil/gas reserve in a subsoil from said final facies repartition image; and wherein, the zones represent at least one zone in a group comprising an environment of deposition zone (ECM), an architectural elements zone (AE), and a large geological body.

2. The method according to claim 1, wherein the computation of uniform values is performed for all points of the images.

3. The method according to claim 1, wherein the distribution value of a value of the $m^{th}$ geophysical attribute in a zone, m being an integer in [1; n], is computed based on:
    a number of points in said zone associated with said value of a $m^{th}$ geophysical attribute; and
    a number of points in said zone.

4. The method according to claim 1, wherein the distribution value of a first value of a $p^{th}$ geophysical attribute in a zone, p being an integer in [1; n], is computed based on:
    a number of points in said zone associated with a value of the $p^{th}$ geophysical attribute, a distance between the value of the $p^{th}$ geophysical attribute and the first value being lower than a predetermined threshold value; and
    a number of points in said zone.

5. The method according to claim 1, wherein computing a uniform value associated with a point comprises:
    determining a first sum, the first sum being a finite sum of distribution values of geophysical attribute values equal or below the geophysical attribute value associated with said point in a zone containing said point; and
    determining a second sum, the second sum being a finite sum of distribution values of a geophysical attribute values in a zone containing said point.

6. The method according to claim 5, wherein the uniform value is function of the division of the first sum by the second sum.

7. The method according to claim 1, wherein the method further comprises:
    receiving well data representing geological information for a plurality of facies associated with well points of the image;
    for each facies, determining modified geological probability values associated with points of the image based on the well data for said facies and the received second information data representing geological probability values for said facies;
    and wherein, for at least one point of the image, determining a facies is based on the computed uniform value for each j in [1; n], and the modified geological probabilities associated with said point.

8. The method according to claim 7, wherein determining modified geological probability values for a facies comprises performing an exact interpolation process based on the well data for said facies and the received second information data representing geological probability values for said facies.

9. The method according to claim 7, wherein determining a facies uses a truncation diagram.

10. The method according to claim 1, wherein n is equal to 2.

11. A non-transitory computer readable storage medium, having stored thereon a computer program comprising program instructions, the computer program being loadable into a data-processing unit and adapted to cause the data-processing unit to carry out the steps of claim 1 when the computer program is run by the data-processing device.

12. A device for determining a lithology map, wherein the device comprises:
- an interface for receiving a geophysical attribute image, the image comprising a plurality of points, each point in the plurality of points being associated with n geophysical attributes, each attribute in the n geophysical attributes having a respective value, n being an integer greater than 0, wherein for each point in the plurality of points, the geophysical attributes are ordered;
- an interface for receiving first information data representing a plurality of zones in the image, each point of the image being contained in a zone;
- for each j in [1; n]:
  - for at least one current point (x) of the image, a circuit for computing a uniform value ($F_j(Y(x))$) associated with the current point (x) based on:
    - a $j^{th}$ geophysical attribute value ($Y(x)$), and wherein the $j^{th}$ geophysical attribute value comprises at least one value in a group comprising a seismic value, an acoustic impedance value and a pseudo V-Clay value, and
    - distributions values ($f_j(y)$) of the $j^{th}$ geophysical attribute value associated with points of the zone containing the current point;
- an interface for receiving second information data representing geological probability values for a plurality of facies, said geological probability values being associated with the points of the image;
- for at least one current point (x) of the image where a uniform value is computed, a circuit for determining a determined facies in the plurality of facies based on:
  - n computed uniform values computed for each geophysical attribute and associated with the current point, and
  - the geological probability values associated with said current point;
- an interface to provide a final facies repartition image based on said determined facies
- a circuit to estimate oil/gas reserves in a subsoil from said final facies repartition image,
  - and wherein, the zones represents at least one zone in a group comprising an environment of deposition zone (EOD), an architectural elements zone (AE) and large geological body.

* * * * *

UNITED STATES PATENT AND TRADEMARK OFFICE
CERTIFICATE OF CORRECTION

PATENT NO. : 10,585,199 B2  
APPLICATION NO. : 14/394981  
DATED : March 10, 2020  
INVENTOR(S) : Pierre Biver et al.

Page 1 of 1

It is certified that error appears in the above-identified patent and that said Letters Patent is hereby corrected as shown below:

On the Title Page

Item (57) In the abstract, Line 9:
Delete "distributions values" and insert -- distribution values --, therefor.

Item (57) In the abstract, Line 16:
Delete "with said" and insert -- with the said --, therefor.

In the Claims

Column 9, Line 58:
Delete "distributions values" and insert -- distribution values --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*